United States Patent [19]

Severinsson

[11] Patent Number: 4,585,097
[45] Date of Patent: Apr. 29, 1986

[54] SLACK ADJUSTER, ESPECIALLY FOR A RAIL VEHICLE BRAKE SYSTEM

[75] Inventor: Lars M. Severinsson, Hishult, Sweden

[73] Assignee: SAB Industri AB, Landskrona, Sweden

[21] Appl. No.: 149,200
[22] PCT Filed: Jan. 25, 1979
[86] PCT No.: PCT/SE79/00019
    § 371 Date: Sep. 13, 1979
    § 102(e) Date: Sep. 13, 1979
[87] PCT Pub. No.: WO79/00557
    PCT Pub. Date: Aug. 23, 1979

[30] Foreign Application Priority Data

Jan. 27, 1978 [SE] Sweden ............................... 7801009

[51] Int. Cl.⁴ ............................................. F16D 65/52
[52] U.S. Cl. ........................... 188/199; 188/196 D; 188/202; 192/111 A
[58] Field of Search ................. 188/196 D, 199, 202; 192/111 A

[56] References Cited

U.S. PATENT DOCUMENTS

| 2,246,873 | 6/1944 | Browall | 188/196 D |
| 2,767,811 | 10/1956 | Browall et al. | 188/196 D |
| 3,043,406 | 7/1962 | Larsson | 188/196 D |
| 3,194,358 | 7/1965 | Brandt | 188/196 D |
| 3,512,619 | 5/1970 | Rouglas | 188/196 D X |
| 3,878,924 | 4/1975 | Nadas | 188/196 D X |
| 4,050,554 | 9/1977 | Scheffel | 188/196 D X |

Primary Examiner—George E. A. Halvosa
Attorney, Agent, or Firm—Laurence R. Brown

[57] ABSTRACT

A slack adjuster for a rail vehicle brake system, comprising a brake force receiving adjuster tube (1, 1A), a spindle (4; 4A) axially movable therein, and two nuts, an adjuster nut (5; 5A) and a leader nut (6; 6A), which are in non-self-locking thread engagement with the spindle and are held resiliently in clutch engagement with a clutch ring (7; 7A) and a control sleeve (16; 16A) respectively, the latter being axially movable in the tube a distance (A) corresponding to the desired slack. In order to transform this so called stroke-sensing adjuster into the so called clearance-sensing type being independent of the elasticity part of the application stroke the adjuster nut (5; 5A) and the clutch ring (7; 7A) in coaction are arranged to submit a force to the leader nut (6; 6A) for locking the latter against rotation under deformation of a resilient element (13; 30; 34; 38; 5A) at the occurrence of a counter-force on the spindle (4; 4A) during the brake application.

7 Claims, 5 Drawing Figures

SLACK ADJUSTER, ESPECIALLY FOR A RAIL VEHICLE BRAKE SYSTEM

TECHNICAL FIELD

This invention relates to a slack adjuster, especially for a rail vehicle brake system, comprising an adjuster tube, on which a brake force is arranged to act in a brake application direction forward, a spindle axially movable therein, and two nuts, an adjuster nut and a leader nut, which are in non-self-locking thread engagement with the spindle and are held resiliently backwards in clutch engagement with a clutch ring and a control sleeve respectively, the latter being axially movable in the tube and the movement forward thereof being limited to a distance corresponding to the desired slack.

BACKGROUND ART

Such a slack adjuster, known in the art as a two-nut adjuster, may be found in U.S. Pat. No. 3,043,406. This slack adjuster may be defined as being of the single-acting, stroke-sensing type sensing the possible excessive slack due to wear on the application stroke (by comparing the real movement of for example a spindle with a control distance in the adjuster) and reducing the slack to the desired value on the return stroke.

In many instances, however, it is preferred to have a clearance-sensing, two-nut slack adjuster in which the effect of the elasticity part of the brake application stroke is removed, retaining the important advantage with a two-nut adjuster (as compared to the one-nut adjuster) being the very short dead stroke (for example less than 1 mm) due to the clutches, which may be compared to a dead stroke of 3 or 4 mm in a one-nut adjuster. This is of special importance for the outer dimensions of a brake unit, in which the slack adjuster is mounted, especially if there is a great leverage within the unit.

DISCLOSURE OF INVENTION

A single-acting, clearance-sensing slack adjuster may according to the invention be attained in that, starting from the stroke-sensing adjuster defined above and shown in GB No. 909 122, the adjuster nut and the clutch ring in coaction are arranged to submit a force to the leader nut for locking the latter against rotation under deformation of a resilient element at the occurrence of a counter-force on the spindle at the brake application stroke.

This counter-force on the spindle will develop, when the braking part, the brake block or brake pad, reaches the braked part, the wheel or the disc. This means that only the real slack is taken into account and not the elasticity in different parts of the brake rigging.

In a practical and preferred embodiment a clutch between the clutch ring and the leader nut, comprises a resilient element between the ring, which is solely axially movable, and the tube as well as a locking element between the nut and the ring with the function to non-rotatably couple together the ring and the nut at the compression of the resilient element due to a counter-force on the spindle.

In the preferred embodiment the locking element is a locking ring, which is solely axially movable on the leader nut and is arranged to be clamped between the clutch ring and a portion of the adjuster tube at the resilient compression of the resilient element, which preferably is a helical spring.

In a modified version the resilient element is at least one cone cup spring, whereas the locking element is a ring shaped as a cup spring and having arms for engagement with the leader nut, preferably provided with axial grooves, at the resilient compression of the ring.

In another modified version the resilient element and the locking element are combined into L-shaped arms, which are attached to the clutch ring and which at its bows are arranged to cooperate with a shoulder in the adjuster tube for deflection of the arms into engagement with the leader nut, preferably provided with axial grooves.

In a further modified version the resilient element and the locking element are combined into a rubber ring, which at its compression in the axial direction will expand in the radial direction into engagement with the leader nut. The locking element may in this case be a slotted ring, which preferably is provided with internal axial teeth and is arranged in the rubber ring for engagement with the leader nut, preferably provided with axial grooves.

The leader nut and the adjuster tube are in all these instances provided with cooperating shoulders, which in the rest position are at a distance from each other but are arranged to transmit the brake force after compression of the resilient element.

In another embodiment a portion of the adjuster nut is axially slotted and encircles the leader nut, said adjuster nut portion being resiliently deformable into engagement with the leader nut by its cooperation with the conical clutch ring, which is integrated with the adjuster tube.

BRIEF DESCRIPTION OF DRAWINGS

The invention will be described in further detail below reference being made to the accompanying drawings, in which.

DETAILED DESCRIPTION OF A PREFERRED EMBODIMENT

Figure 1:
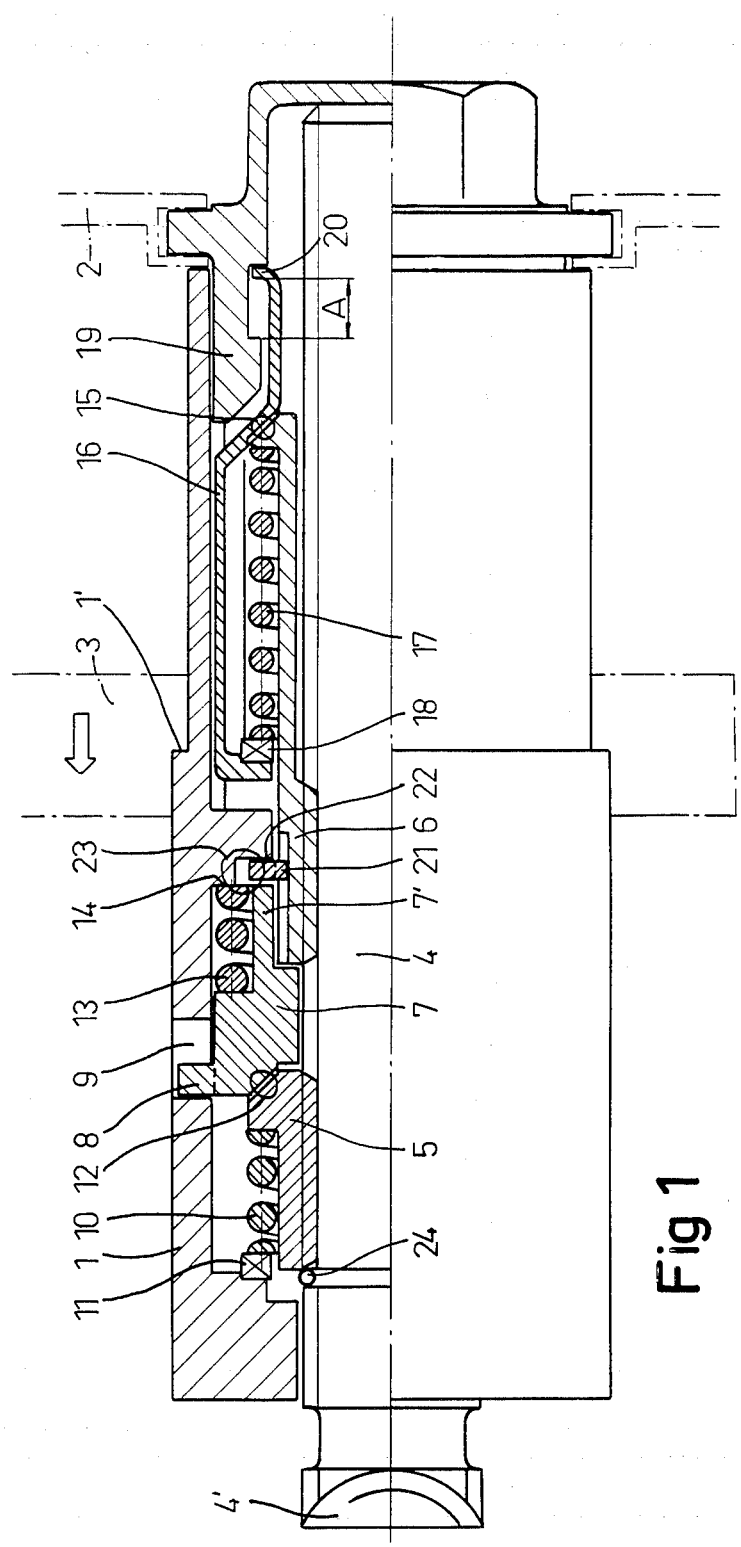
FIG. 1 is a side-view, partly in cross section, of a slack adjuster according to the invention.

In FIG. 1 is shown a slack adjuster built into a brake unit, of which some parts are indicated with dash-dotted lines. The adjuster may, however, quite as well be used separately in any brake rigging for a rail vehicle.

An adjuster tube 1 is axially movable in a fixed brake unit housing, which only is indicated by a rear wall 2. A brake force may be applied axially on the adjuster tube 1 in a brake application direction (indicated by an arrow) via a brake force applying part 3, which is actuated in a way not described and acts on an adjuster tube shoulder 1'. A threaded spindle 4 is movable coaxially within the adjuster tube 1. The spindle 4 is at its end projecting out of the housing provided with a wedge shaped part 4' for acting on further elements (not shown) in the vehicle brake rigging. The spindle 4 is thus held against rotation.

Two nuts, an adjuster nut 5 and a leader nut 6, are in non-self-locking thread engagement with the spindle 4. A clutch ring 7 is arranged between said two nuts and is only axially movable a certain distance relative to the adjuster tube 1 in that one or more lugs 8 on the clutch ring 7 extend into one or more corresponding axial grooves 9 in said tube.

The adjuster nut 5 is biased backwards against the clutch ring 7 by means of an adjuster nut spring 10 of the helical compression type, which is supported by the tube 1 via a thrust bearing 11 alowing relative rotation. A first clutch 12, preferably toothed, is formed between the adjuster nut 5 and the clutch ring 7.

The clutch ring 7 is biased forwards against the forward end of the tube grooves 9 by means of a helical compression spring 13 between the clutch ring and a first adjuster tube shoulder 14.

The leader nut 6 forms a second clutch 15, preferably toothed, with a control sleeve 16, which is only axially movable relative to the adjuster tube 1 by being provided with longitudinal ridges coacting with corresponding grooves in the tube. The clutch 15 is normally held in engagement by means of a helical compression spring 17 arranged between the nut and the sleeve 16. A thrust bearing 18 will allow relative rotation between these two parts.

A cover 19 is mounted in the brake unit housing end wall 2 and is only conditionally rotatable in relation thereto. No relative rotation between the adjuster tube 1 and the cover 19 is permitted due to the interaction between longitudinal ridges and grooves in the two parts. The part of the cover 19 extending out of the brake unit housing 2 is provided with a tool grip for a purpose to be mentioned below.

Due to the interaction between a recess in the cover 19 and an end flange 20 of the control sleeve 16 the latter may only move forward a distance A, called the control distance and corresponding to the desired slack in the brake rigging.

A locking ring 21 is non-rotatably but axially movably arranged on the leader nut 6 by being provided with radial lugs or projections coacting with axial grooves or the like on the nut. The locking ring may be clamped between a clutch ring extension 7' and a second shoulder 22 on the adjuster tube 1. A third clutch 23 is thus created between the leader nut 6 and the clutch ring 7 only allowing the former to move axially but not to rotate when engaged.

A stop ring 24 is provided on the spindle 4 so as to prevent relative movements between the spindle 4 and the adjuster nut 5 past the shown position.

The shown and described device will function in the following way:

Brake application—the slack corresponds to the control distance A

Starting from the rest position of the slack adjuster as shown in FIG. 1, an application of a brake force from the part 3 on the adjuster tube 1 will have the effect that all parts except the end wall 2 and the cover 19 will move to the left in the drawing as a unit. If, as stated, the slack between the braking part and the braked part, i.e. the brake block or pad and the wheel rim or disc respectively, corresponds exactly to the control distance, or in other words the slack is the desired, the control distance A will be consumed at the same time as the braking part reaches the braked part. At the further application a counter-force will be created in the spindle 4 transmitted via the adjuster nut 5 to the axially movable clutch ring 7 and overcoming the force of the compression spring 13, so that the locking ring 21 will be clamped between the clutch ring extension 7' and the tube shoulder 22. In this way the leader nut 6 will be non-rotatably clutched to the clutch ring 7 during the braking action itself, and no relative rotation will take place although the clutch 15 is opened under compression of spring 17.

At the release stroke, especially its elasticity part, the clutch 15 will be engaged before the clutch 23 disengages resulting in the returning of all the different parts of the slack adjuster to their shown positions without any changes in their relative positions.

Brake application—the slack exceeds the control distance A

Again starting from the rest position shown in FIG. 1 all parts except the end wall 2 and the cover 19 will move to the left as a unit at the application of the brake force by the part 3. The control distance A will now be consumed before the braking part reaches the braked part, which means that no counterforce will act on the spindle 4 or in other words that the clutch 23 is still open, when the clutch 15 disengages due to the fact that the control sleeve 16 is prevented from moving further forward by the cover 19. At the further movement to the left by the different parts (except now also the control sleeve 16) and before the braking part reaches the braked part the leader nut 6 will be free to rotate on the spindle 4. This rotation of the leader nut 6 corresponds to a relative axial movement of said nut on the spindle 4. This axial movement corresponds exactly to the exceeding slack, because when the braking part reaches the braked part, a counter-force will be developed in the spindle 4 and will as earlier described engage clutch 23 thus preventing further rotation of the leader nut 6.

At the release stroke the clutch 15 will be engaged and the clutch 23 disengaged, which means that the leader nut 6 is non-rotatably held in its new position on the spindle 4 attained during the application stroke. When a return stroke corresponding only to the exceeding slack remains, the spindle 4 will be prevented from moving further to the right in FIG. 1 due to the leader nut 6. The clutch 12 will now be disengaged allowing the adjuster nut 5 to rotate on the spindle 4 and thus to attain a new position thereon in the same relative position to the leader nut 6 as shown in the drawing. Now the slack adjuster is ready for a new brake application operation with the spindle 4 in a new position.

Replacement of worn-out brake blocks or pads

When it is desired to replace worn-out brake blocks or pads, it will be necessary to bring back the spindle 4, preferably to its position shown in FIG. 1. The adjuster tube 1 with all parts associated therewith may thus be rotated manually from the outside by means of a suitable tool applied to the tool grip of the cover 19, which first must be rotationally disengaged from the brake unit end wall 2. As the spindle 4 is held against rotation at its part 4' it will move backwards in the slack adjuster, until the adjuster nut 5 reaches the stop ring 24.

When the worn-out brake blocks or pads have been replaced the correct slack in the brake rigging is restored in one of a few brake applications depending on the magnitude of the exceeding slack.

Modifications

It is obvious that the characteristic feature of the invention is that the leader nut 6 is locked against further rotation at the occurence of a counter-force in the spindle 4, i.e. during the last part or elasticity part of the brake application. The counter-force is transmitted via the adjuster nut 5 and the clutch ring 7.

In the embodiment according to FIG. 1 the counter-force will effect an engagement of the clutch 23. Functionally two elements are necessary: a resilient element between the solely axially movable clutch ring 7 and the adjuster tube 1—in FIG. 1 the compression spring 13—and a locking element between the leader nut 6 and the clutch ring 7—in FIG. 1 the locking ring 21.

Different designs for these two elements are possible, although the one shown in FIG. 1 is the preferred embodiment.

Figure 2:
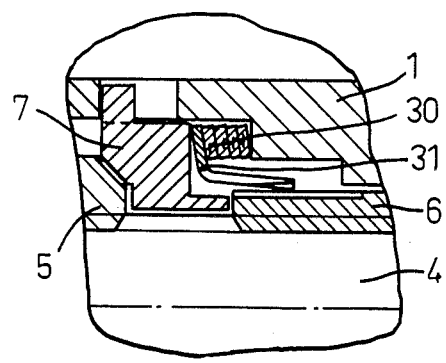
FIGS. 2-4 show limited portions of three different modifications of the slack adjuster according to FIG. 1.
Figure 3:
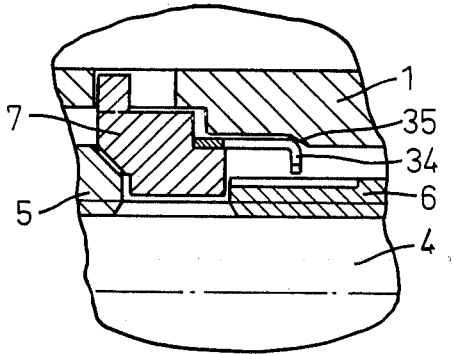
Figure 4:
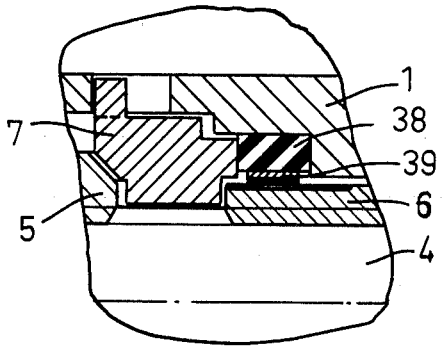

Examples of modifications are shown in FIGS. 2-4. The following elements are recognized from FIG. 1, although they may be somewhat differently designed and dimensioned: the adjuster tube 1, the spindle 4, the adjuster nut 5, the leader nut 6, and the clutch ring 7.

In the FIG. 2 embodiment there are some cup springs 30 arranged between the clutch ring 7 and the adjuster tube 1. Together with these cup springs is also arranged a locking element 31 in the form of a ring with arms for engagement with the leader nut 6 at the clamping together of the ring and the cup springs 30. The nut 6 is provided with axial grooves, and the ends of said arms are correspondingly shaped so as to permit relative axial movements of the nut relative to the locking element 31 in spite of the engagement of the latter.

Another possibility shown in FIG. 3 is to combine the resilient function and the locking function into one element 34, which is designed as a ring attached to the clutch ring 7 and provided with L-shaped arms, which at its bows cooperate with an inclined shoulder 35 in the adjuster tube 1. At the movement to the right in FIG. 3 of the clutch ring 7 relative to the tube 1 due to a counter-force in the spindle 4 the element 34 due to its cooperation with the shoulder 35 will act as a resilient element and will be biased into engagement with the leader nut 6 thus also acting as the locking element.

A fourth example is shown in FIG. 4. In this case the resilient element is a ring 38 of rubber or the like, which due to its shown mounting will only have the possibility to expand radially inwards at its axial compression. In the shown case it is provided with a slotted ring 39 at its inner periphery for locking engagement with the leader nut 6. This ring may however be suspended with and the rubber ring itself lockingly engage the nut 6.

Figure 5:
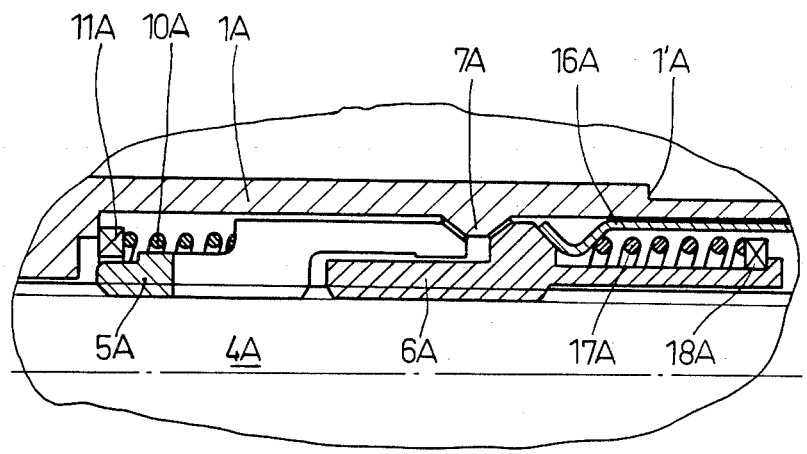
FIG. 5 shows a limited portion of another embodiment of a slack adjuster according to the invention.

Another and somewhat different embodiment is shown in FIG. 5. The same numerals are used for the same parts as in FIG. 1 but with the addition of the letter A. The following parts, although somewhat differently designed, may thus be found in FIG. 5: the adjuster tube 1A with its shoulder 1'A, the spindle 4A, the adjuster nut 5A, the leader nut 6A, the clutch ring 7A, the adjuster nut spring 10A, the thrust bearing 11A, the control sleeve 16A (only moving the control distance to the left in the drawing), the compression spring 17A, and the thrust bearing 18A.

The major differences as compared to the FIG. 1 embodiment is that the clutch ring 7A is integrated with the adjuster tube 1A and that a portion of the adjuster nut 5A is axially slotted and encircles a part of the leader nut 6A. This adjuster nut portion may be resiliently deformed by the clutch ring 7A into engagement with the leader nut 6A so as to prevent the latter from further rotation.

This will occur during a brake application stroke with a slack exceeding the control distance, which means that the leader nut 6A will be free to rotate on the spindle 4A until a counter-force occurs in the spindle 4A and thus in the adjuster nut 5A due to the fact that the braking part in the brake rigging has reached the braked part. The conical clutch ring 7A will then force the slotted portion of the adjuster nut 5A into engagement with the leader nut 6A. Due to its resiliency the slotted portion of the adjuster nut 5A will reassume its position shown in FIG. 5 out of contact with the leader nut 6A during the return stroke or in other words when the counter-force disappears.

Also other embodiments are conceivable within the scope of the appended claims. Especially it may be noted that, although the slack adjuster has been shown and described as being of the pushing type, it may with only minor modifications be converted into the pulling type.

I claim:

1. A single acting slack adjuster, especially for a rail vehicle brake system, comprising in combination an adjuster tube movable in a forward direction in response to a brake force in a brake application stroke direction, a spindle axially movable in said tube, an adjuster nut and a leader nut, which nuts are in non-self-locking thread engagement with the spindle, a clutch ring disposed non-rotatably about said spindle, means biasing the adjuster nut in a backward direction in engagement with said clutch ring, a control sleeve axially movable in the tube and the movement forward thereof being limited to a distance (A) corresponding to the desired slack, means biasing the leader nut in a backward direction in engagement with the control sleeve, means coupling a braking force on the spindle through the adjuster nut and clutch ring in coaction, and locking means including a clutch biased by a compression spring coupling the leader nut and the clutch ring in coaction in response to said braking force on the spindle for locking the leader nut with the clutch ring against rotation upon compression of said spring to a counter-force on the spindle during the brake application stroke.

2. A slack adjuster according to claim 1, wherein the compression spring is a helical spring, wherein the locking means spring is solely axially movable, and the leader nut is locked by a locking element disposed between the tube and the clutch ring which functions to non-rotatably couple together the ring and the leader nut at the compression of the helical spring due to the counter-force on the spindle.

3. A slack adjuster according to claim 2, characterized in that the locking element is a locking ring, which is solely axially movable on the leader nut and is arranged to be clamped between the clutch ring and a portion of the adjuster tube at the resilient compression of said compression spring.

4. A slack adjuster according to claim 1, characterized in that the leader nut has axial grooves and in that the compression spring comprises at least one cup spring and having arms for engagement with the leader nut with axial grooves, at the compression of the cup spring.

5. A slack adjuster according to claim 1, characterized in that the leader nut has axial grooves, and in that the compression spring and the locking element comprises L-shaped arms attached to the clutch ring, a shoulder in the adjuster tube mating with the L-shaped arms for deflection of the arms into engagement with the leader nut axial grooves.

6. A slack adjuster according to claim 1, characterized in that the compression spring and the locking element comprise a ring of rubber or the like, which at its compression in the axial direction will expand in the radial direction into engagement with the leader nut.

7. A slack adjuster according to claim 6, characterized in that the leader nut has axial grooves and in that a slotted ring provided with internal axial teeth is arranged in the rubber ring for engagement with the leader nut axial grooves.

* * * * *